US012563210B1

(12) United States Patent
Mollaahmadi Dehaghi et al.

(10) Patent No.: US 12,563,210 B1
(45) Date of Patent: Feb. 24, 2026

(54) QUANTIZATION PARAMETER-AWARE TRANSFORMER-DIFFUSION APPROACH FOR 8K VIDEO RESTORATION UNDER CODEC COMPRESSION

(71) Applicant: Userful Corporation, Calgary (CA)

(72) Inventors: Ali Mollaahmadi Dehaghi, Calgary (CA); Mohammad Moshirpour, Irvine, CA (US); Reza Razavi, Calgary (CA)

(73) Assignee: Userful Corporation (CA)

( * ) Notice: Subject to any disclaimer, the term of this patent is extended or adjusted under 35 U.S.C. 154(b) by 0 days.

(21) Appl. No.: 19/303,143

(22) Filed: Aug. 18, 2025

Related U.S. Application Data

(60) Provisional application No. 63/685,007, filed on Aug. 20, 2024.

(51) Int. Cl.
| | |
|---|---|
| *H04N 19/42* | (2014.01) |
| *H04N 19/124* | (2014.01) |
| *H04N 19/132* | (2014.01) |
| *H04N 19/136* | (2014.01) |
| *H04N 19/154* | (2014.01) |
| *H04N 19/172* | (2014.01) |
| *H04N 19/176* | (2014.01) |

(52) U.S. Cl.
CPC ........... *H04N 19/42* (2014.11); *H04N 19/124* (2014.11); *H04N 19/132* (2014.11); *H04N 19/136* (2014.11); *H04N 19/172* (2014.11); *H04N 19/176* (2014.11); *H04N 19/154* (2014.11)

(58) Field of Classification Search
CPC .... H04N 19/42; H04N 19/124; H04N 19/132; H04N 19/136; H04N 19/172; H04N 19/176; H04N 19/154
See application file for complete search history.

(56) References Cited

U.S. PATENT DOCUMENTS

2024/0296919 A1* 9/2024 Alesiani ................. G16C 20/70

* cited by examiner

*Primary Examiner* — Jae N Noh
(74) *Attorney, Agent, or Firm* — Van Pelt, Yi & James LLP

(57) ABSTRACT

A sequence of compressed video frames is received. A transformer diffusion model is applied to the sequence of compressed video frames. Applying the transformer diffusion model includes utilizing a look around model in an encoding portion of the transformer diffusion model and a look ahead model in a decoding portion of the transformer diffusion model. A restored video sequence is generated based on an output of the transformer diffusion model.

20 Claims, 13 Drawing Sheets

200

Original RAW 8K frame

200

312

316

Derivative Value: 0.00000

First Derivative of the Average Difference per Window Size

Table 1.Performance Comparision on SEPE8K and UVG with
AV1(QP=255) and HEVC (QP=51) codecs (a) SEPE8K with AV1 (QP = 255)

| Model | PSNR | SSIM |
|---|---|---|
| DiQP | 34.868 | 0.8611 |
| FTVSR | 33.201 | 0.8525 |
| RVRT | 33.113 | 0.8577 |
| VRT | 33.101 | 0.8501 |
| BasicVSR++ | 33.105 | 0.8469 |
| Degraded Input | 33.095 | 0.8463 |

(b) SEPE8K with HEVC (QP = 51)

| Model | PSNR | SSIM |
|---|---|---|
| DiQP | 34.197 | 0.8538 |
| FTVSR | 32.316 | 0.8472 |
| RVRT | 32.281 | 0.8491 |
| VRT | 32.213 | 0.8464 |
| BasicVSR++ | 32.211 | 0.8395 |
| Degraded Input | 32.206 | 0.8393 |

(c) UVG with AV1 (QP = 255)

| Model | PSNR | SSIM |
|---|---|---|
| DiQP | 32.551 | 0.8662 |
| FTVSR | 31.880 | 0.8511 |
| RVRT | 31.711 | 0.8545 |
| VRT | 31.708 | 0.8506 |
| BasicVSR++ | 31.706 | 0.8463 |
| Degraded Input | 31.702 | 0.8461 |

(d) UVG with HEVC (QP = 51)

| Model | PSNR | SSIM |
|---|---|---|
| DiQP | 31.965 | 0.8590 |
| FTVSR | 31.289 | 0.8485 |
| RVRT | 31.271 | 0.8498 |
| VRT | 31.270 | 0.8481 |
| BasicVSR++ | 31.269 | 0.8430 |
| Degraded Input | 31.267 | 0.8426 |

FIG. 9

Table 2. Model Parameters and Runtime Comparison

| Method | Params (M) | Runtime (ms) |
|---|---|---|
| DiQP | 79.37 | 125 |
| FTVSR | 10.8 | 499 |
| RVRT | 10.8 | 321 |
| VRT | 35.6 | 427 |
| BasicVSR++ | 7.3 | 135 |

FIG. 10

QUANTIZATION PARAMETER-AWARE TRANSFORMER-DIFFUSION APPROACH FOR 8K VIDEO RESTORATION UNDER CODEC COMPRESSION

CROSS REFERENCE TO OTHER APPLICATIONS

This application claims priority to U.S. Provisional Patent Application No. 63/685,007 entitled QP-AWARE TRANS-FORMER-DIFFUSION APPROACH FOR 8K VIDEO RESTORATION UNDER CODEC COMPRESSION filed Aug. 20, 2024 which is incorporated herein by reference for all purposes.

BACKGROUND OF THE INVENTION

Video Diffusion Models' applications contain a wide scope of video analysis tasks, including video generation and video editing. The methodologies for these tasks share similarities, often formulating the problems as Diffusion generation tasks or utilizing the potent controlled generation capabilities of Diffusion models for downstream tasks. In video enhancement and restoration, Channel-aware Deformable Modulation (CaDM) introduces a new approach to video streaming, reducing bitrates while improving video restoration quality compared to existing methods. This is achieved by reducing frame resolution and color depth during encoding, and then utilizing a Diffusion-based restoration process at the decoder that is aware of these encoding conditions. Latent Diffusion Model for Video Fram Interpolation (LDMVFI) marks an advancement in video frame interpolation by utilizing a conditional latent Diffusion model. It features an autoencoding network tailored for video frame interpolation, incorporating efficient self-attention mechanisms and deformable kernel-based synthesis for superior performance. Video Impainting with a Diffusion Model (VIDM) leverages a pre-trained Latent Diffusion Model (LDM) to tackle video in-painting, demonstrating the adaptability of this tool. By providing a mask for first-person perspective videos, VIDM harnesses the image completion capabilities of LDM to generate seamless in-painted videos.

Video Transformers have found applications in various domains due to their ability to model long-range dependencies efficiently. These applications showcase the versatility and effectiveness of Video Transformers in various video processing tasks. In the restoration task, a Video Restoration Transformer (VRT), allows for parallel processing of long video sequences and models long-range dependencies for video restoration. VRT jointly extracts, aligns, and fuses features at multiple scales using a novel mutual attention mechanism, achieving great performance in various video restoration tasks. The recurrent video restoration transformer (RVRT) combines the strengths of parallel and recurrent methods for efficient and effective video restoration. It processes video clips jointly, utilizes a larger hidden state to alleviate information loss, and introduces a novel guided deformable attention mechanism for accurate video clip alignment.

Video Restoration has gained significant attention in recent years. Frequency-based Transformer for Video Super-Resolution (FTVSR) uses frequency-based patch representations and attention mechanisms to address the challenges of compressed video restoration. This approach preserves high-frequency details and leverages low-frequency information to guide high-frequency texture generation, effectively reducing compression artifacts. BasicVSR++ improves video super-resolution using two main techniques: second-order grid propagation, which allows for more flexible information flow and aggregation across frames, and flow-guided deformable alignment, which utilizes optical flow to refine feature alignment across misaligned frames. These enhancements lead to better utilization of spatio-temporal information and improve overall performance. Compression-Aware Video Super-Resolution (CAVSR) is designed to enhance video super-resolution specifically for compressed videos. It incorporates a compression encoder to assess compression levels in frames, using metadata such as frame type and motion vectors. This information is then used to modulate a base VSR model, enabling adaptive handling of various compression levels. The model further utilizes metadata like residual maps for accurate frame alignment, enhancing the bidirectional recurrent network's performance. In addition to the aforementioned multi-frame-based models, Video Compression-Informed Super-Resolution (VCISR) introduces an approach for the blind single image super-resolution (SISR) task that focuses on enhancing single-frame input affected by video compression artifacts, relying solely on spatial information.

8K video offers exceptional resolution, contrast, and motion quality, but it demands significant data and computational power for transmitting and coding. With an estimated 15% of global electricity consumption attributed to information and communication technology (ICT) by 2040, and video traffic accounting for 82% of global Internet traffic in 2022, efficient storage and transmission are increasingly crucial, particularly in bandwidth-limited scenarios prevalent in certain regions and demographics. Video codecs offer a solution by compressing video data, but this often introduces visual artifacts like blockiness, blurring, or ringing, due to the lossy nature of compression algorithms.

BRIEF DESCRIPTION OF THE DRAWINGS

Various embodiments of the invention are disclosed in the following detailed description and the accompanying drawings.

FIG. 9 is a table comparing performance.

FIG. 10 is a table comparing model parameters and runtime.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
FIGS. 1A and 1B illustrate the impact of increasing Quantization Parameter values on video quality.
Figure 1B:
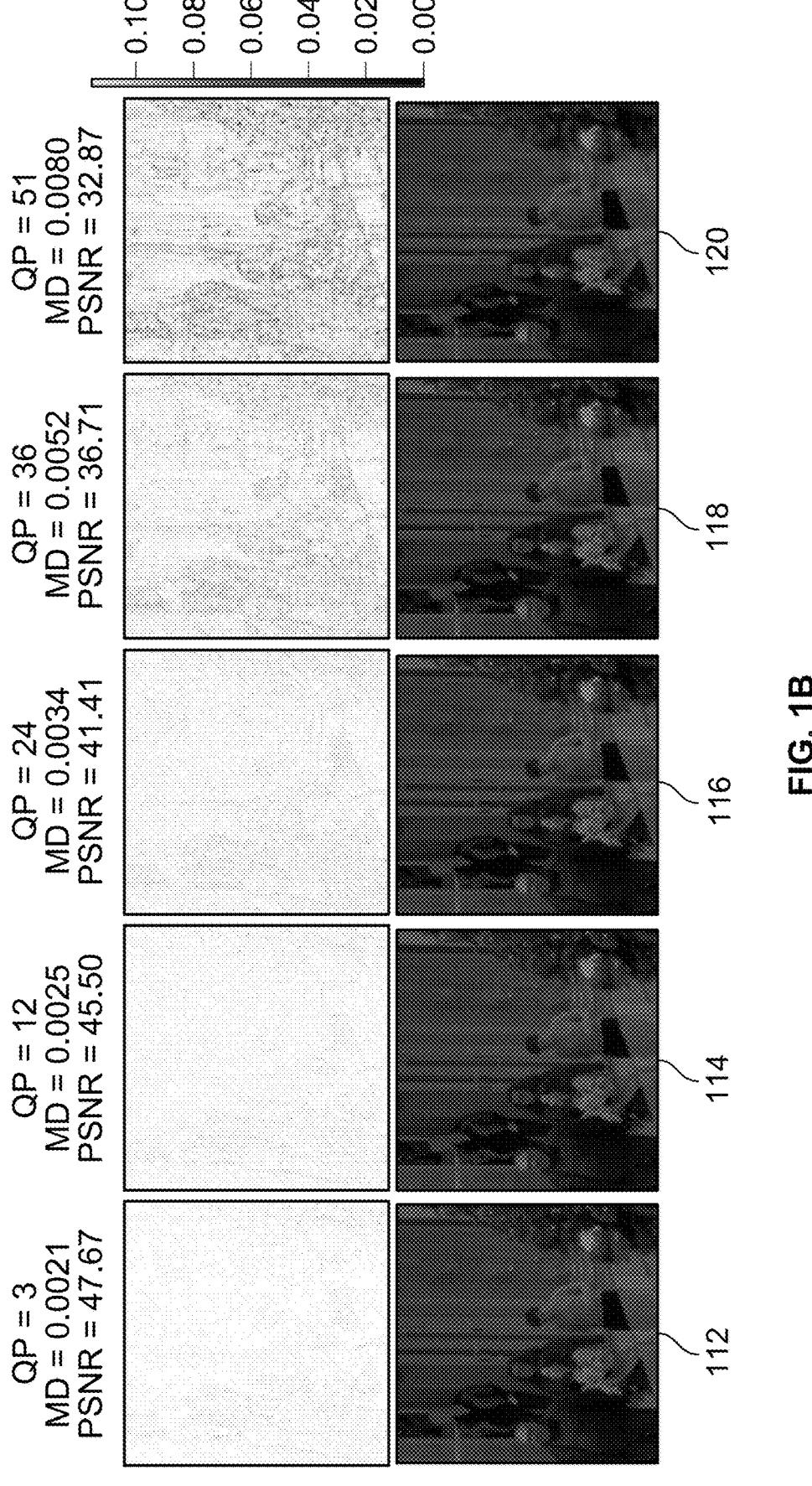

Video codecs compress video data using lossy algorithms, with the Quantization Parameter (QP) controlling the level of quantization applied to transform coefficients and thereby influencing the balance between compression efficiency and visual fidelity. FIG. 1 illustrates the impact of increasing QP values on video quality using an 8K RAW frame 102 from a holiday mall scene. The original uncompressed frame 102 is shown on the left, with a box 104 indicating a zoomed-in region used for analysis. To the right, reconstructed frames 112, 114, 116, 118, and 120 at QP values of 3, 12, 24, 36, and 51, respectively, are displayed, showing progressively greater visual degradation as QP increases. Each row includes both the reconstructed frame and a corresponding heatmap representing the Mean Absolute Difference (MD) between the original and compressed versions. These heatmaps highlight spatially varying distortions, with darker regions indicating minimal change and brighter areas revealing more significant artifacts. PSNR values are also reported above each heatmap, quantitatively confirming the inverse relationship between QP and perceptual quality—lower PSNR scores indicate higher compression and visual loss. FIG. 1 demonstrates how compression artifacts become more prominent and unevenly distributed at higher QP levels.

Deep generative models, such as Denoising Diffusion Probabilistic Models (DDPMs), offer a compelling alternative to Generative Adversarial Networks (GANs) without the need for adversarial training, careful optimization, or the risk of missing parts of the data distribution. DDPMs achieve this by training denoising models to progressively transform Gaussian noise into images through a Markov chain process, providing a stable and effective generative approach. While DDPMs produce high-quality images through a lengthy generative process, this method requires numerous iterations, making it significantly slower than GANs. For instance, generating 50,000 images of size 256×256 can take nearly 1,000 hours on a Nvidia 2080 Ti GPU, which becomes increasingly impractical for larger resolutions. To address this efficiency gap, Denoising Diffusion Implicit Models (DDIMs) were introduced as a more efficient alternative to DDPMs. DDIMs generalize the forward Diffusion process from the Markovian framework used in DDPMs to non-Markovian processes. This allows for the creation of "short" generative Markov chains that can produce high-quality samples in far fewer steps.

Cold Diffusion further explores the boundaries of Diffusion models by eliminating the reliance on Gaussian noise or randomness altogether. Instead of using noise, it leverages arbitrary image transformations and degradations, training a restoration network to reverse these transformations. This approach challenges the traditional theoretical frameworks of Diffusion models and opens the door to new types of generative models with distinct properties compared to conventional methods.

Moreover, the use of Gaussian noise schedules not only prevents Stable Diffusion models from generating images with mean brightness greater or less than 0 (on a scale of −1 to 1), but also proves to be an overextension of model's capacity. This is particularly true for restoration tasks, where the model must remove both artificially added Gaussian noise and existing artifacts. Since compressed frames are not a natural intermediate step in the vanilla Diffusion process, the restoration process does not need to start from pure noise, nor does it require a large number of inference steps or a large model size-advantages that are critical for real-world applications. Taking this into account, the transformer model disclosed herein demonstrates the use of Denoising Diffusion to directly address the complex artifacts introduced by video compression in 8K resolution without adding artificial Gaussian noise.

The systems and methods disclosed herein address the challenge of restoring high-quality video from degraded, compressed sources. Video restoration, particularly for heavily compressed videos, is a highly challenging and ill-posed problem due to the inherent trade-off between compression and quality. This process involves multiple techniques, including denoising to eliminate artifacts, deblurring to sharpen frames, super-resolution to enhance details, and crucially, reducing compression artifacts, all aimed at recovering lost visual information. These challenges are amplified in high-resolution formats, such as 8K, where the massive data volume intensifies the difficulty of artifact removal and quality restoration.

Figure 2:
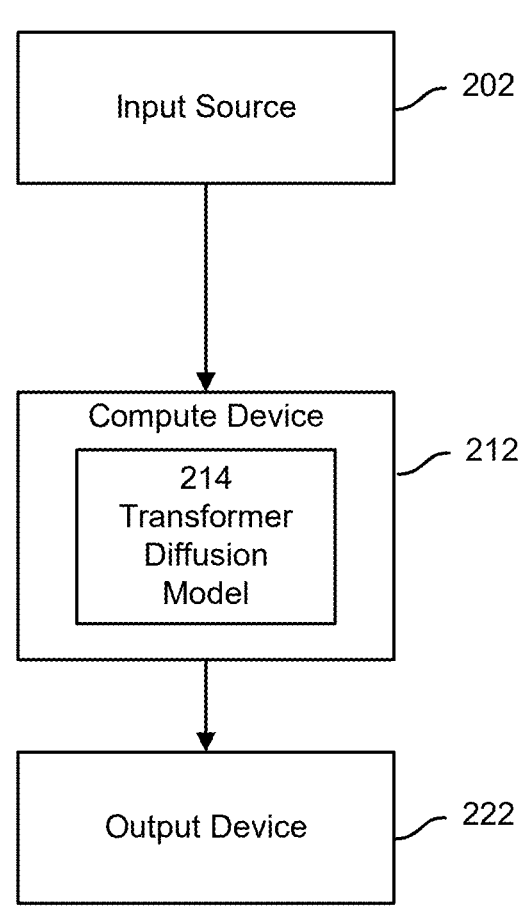
FIG. 2 is a block diagram illustrating a system to restore video degraded by codec compression in accordance with some embodiments.

FIG. 2 is a block diagram illustrating a system to restore video degraded by codec compression in accordance with some embodiments. In the example shown, system 200 includes an input source 202, a compute device 212, and an output device 222.

Input source 202 stores a set of compressed video frames. In some embodiments, the set of compressed video frames are 8K video frames that have been degraded by codec compression (e.g., AV1 or HEVC) with a specified QP. Input source 202 may be local storage (e.g., SSD, HDD RAID or NAS) or remote storage. Input source 202 is configured to provide the set of compressed video frames to compute device 212.

Compute device 212 is a hardware system capable of performing computational tasks, such as data processing, mathematical operations, or running algorithms. Compute device 212 may include a plurality of central processing units (CPUs), a plurality of graphics processing units (GPUs), a plurality of tensor processing units (TPUs), etc.

Compute device 212 includes a transformer diffusion model 214 that is configured to receive the set of compressed video frames from input source 202 and perform video restoration.

Output device 222 is configured to receive the reconstructed video frames from compute device 212. In some embodiments, output device 222 is a storage device that is local or network attached to compute device 212. In some embodiments, output device 222 is cloud storage (e.g., AWS S3, Google Cloud Storage, Azure Blob Storage).

Figure 3:
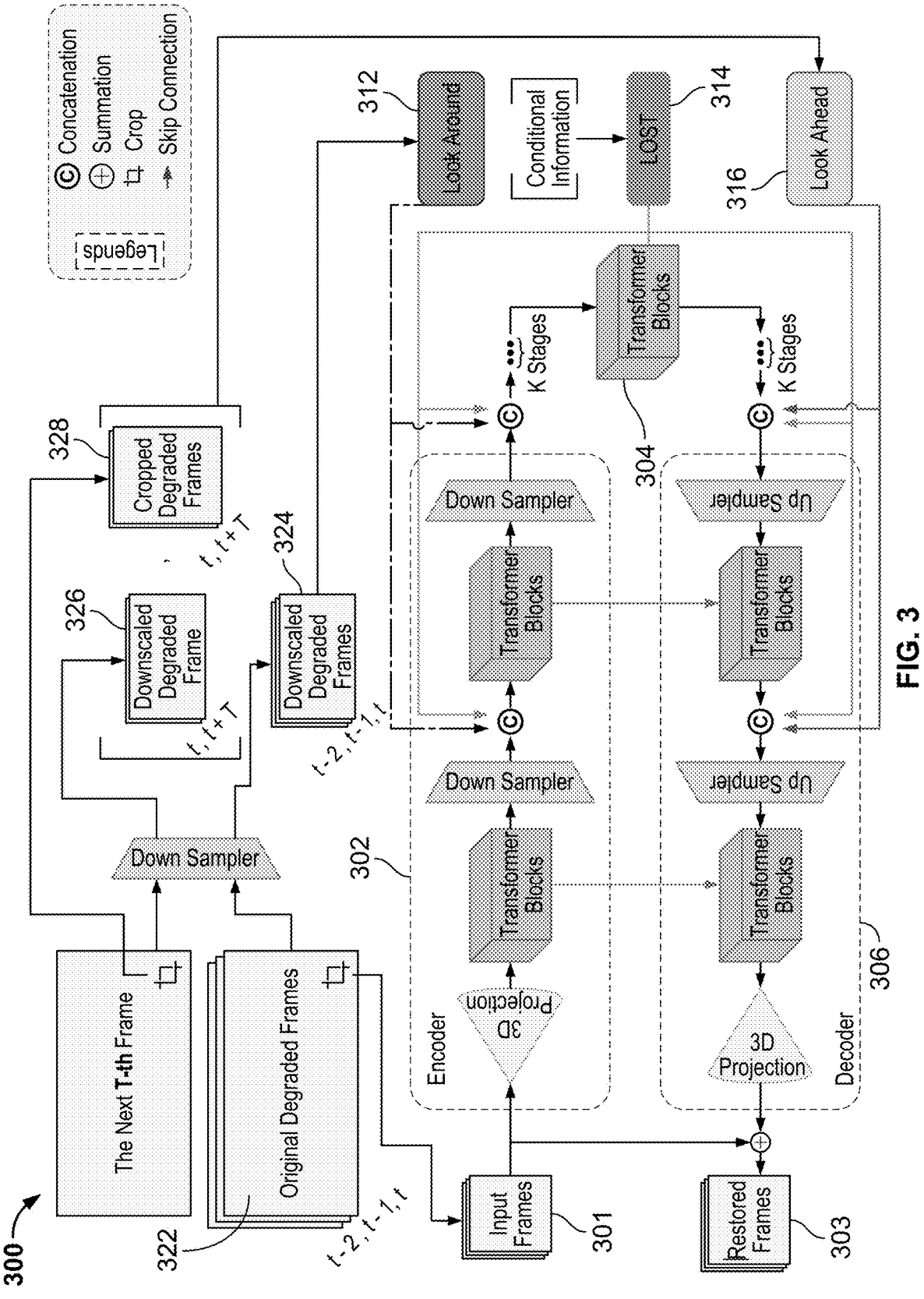
FIG. 3 is a diagram illustrating a transformer diffusion model in accordance with some embodiments.

The systems and methods disclosed herein utilize a novel Transformer Diffusion model (also referred herein as "DiQP"). As seen in FIG. 3, the transformer diffusion model 300 not only introduces a novel approach to reducing video compression artifacts, but also is the first model specifically designed and trained for 8K videos. The transformer diffusion model 300 uniquely reverses the codec side effects by using Denoising Diffusion. While modern codecs, such as AV1 and HEVC, utilize adaptive QPs, the systems and methods disclosed herein focus on fixed QPs to ensure robustness across varying compression levels. Unlike previous methods that add artificial noise, the transformer diffusion model 300 directly addresses complex compression artifacts by leveraging the inherent noise introduced during compression.

The transformer diffusion model 300 features a U-shaped hierarchical network with skip connections and enhanced windowed self-attention for capturing long-range dependencies in high-resolution videos while preserving local context. The Look Around model 312 and Look Around model 316 further enhance temporal coherence and global awareness, while LOST embedding 314 effectively incorporates conditional data. This combination of components allows the transformer diffusion model 300 to effectively reverse compression degradation, and significantly improve video quality restoration; particularly for 8K content.

FIG. 3 is a diagram illustrating a transformer diffusion model in accordance with some embodiments. In the example shown, transformer diffusion model 300 may be implemented as a transformer diffusion model, such as transformer diffusion model 214.

Transformer diffusion model 300 includes an encoder 302, an intermediate stage 304, and a decoder 306. Let $F_{raw} \in R^{T \times H \times W \times C}$, be a sequence of raw target frames without added artifacts and distortions. T, H, W, C are the frame number, height, width and channel number, respectively. Consider $CODEC_{Decode}(CODEC_{Encode}(F_{raw}, \quad QP))= F_{qp}=F_{raw}+noise_{qp}$, transformer diffusion model 300 aims to predict the $noise_{qp}$ as accurately as possible. Therefore, transformer diffusion model 300 is formulated as as DiQP $(F_{iqp},QP, Z)=noise'_{qp}$, where $F_{iqp}$ is a randomly selected window from the original 8K frame, calculated by the Hadamard product of $F_{qp}$ and a random binary mask $M^{h \times w}$: $F_{iqp}=F_{qp} \cdot M$. The reconstructed output frame sequence $F_{res}$ is then obtained as $F_{res}=F_{iqp}+noise'_{qp}$. Additional input Z includes both conditional inputs and the inputs specifically for the Look Ahead and Look Around models. For a fair comparison with existing methods, the Charbonnier loss is utilized between the reconstructed frame sequence and the ground truth or raw sequence, defined as:

$$\mathcal{L} = \sqrt{\|F_{res} - (F_{raw} \circ M)\|^2 + \epsilon^2}$$

and $\epsilon=10^{-3}$ is a constant.

A set of input frames 301 is provided to the encoder 302. After processing through encoder 302, intermediate stage 304, and decoder 306, transformer diffusion model 300 outputs a set of restored frames 303.

Encoder 302

Encoder 302 is configured to receive the set of input frames 301 and perform a 3D projection to convert them into spatial-temporal feature maps. The projected input is then processed by an initial set of transformer blocks, followed by an initial down sampler. The output of the initial down sampler is concatenated with corresponding features from the Look Around model 312 and the LOST embedding 314 before being passed to the next stage of Encoder 302.

Look Around model 312 is configured to enhance the transformer diffusion model 300's awareness of the spatial context surrounding a cropped region within a high-resolution 8K frame. Given that 8K frames (7680×4320) are substantially larger than the model's typical 512×512 input window, covering less than 1% of the full frame, Look Around Model 312 supplements the limited field of view by processing a downscaled version of the entire frame. This provides additional contextual features that help the transformer diffusion model 300 interpret patterns and edges near crop boundaries more accurately, reducing the risk of misrepresentation due to insufficient surrounding information.

The input to the Look Around model 312 is a bicubically down sampled (DS) versions 324 of the original degraded frames 322.

$LookAround(DS(F_{qp}^{7680 \times 4320}))=L_{ar}$ where DS( ) is the downsampling function.

Figure 4A:
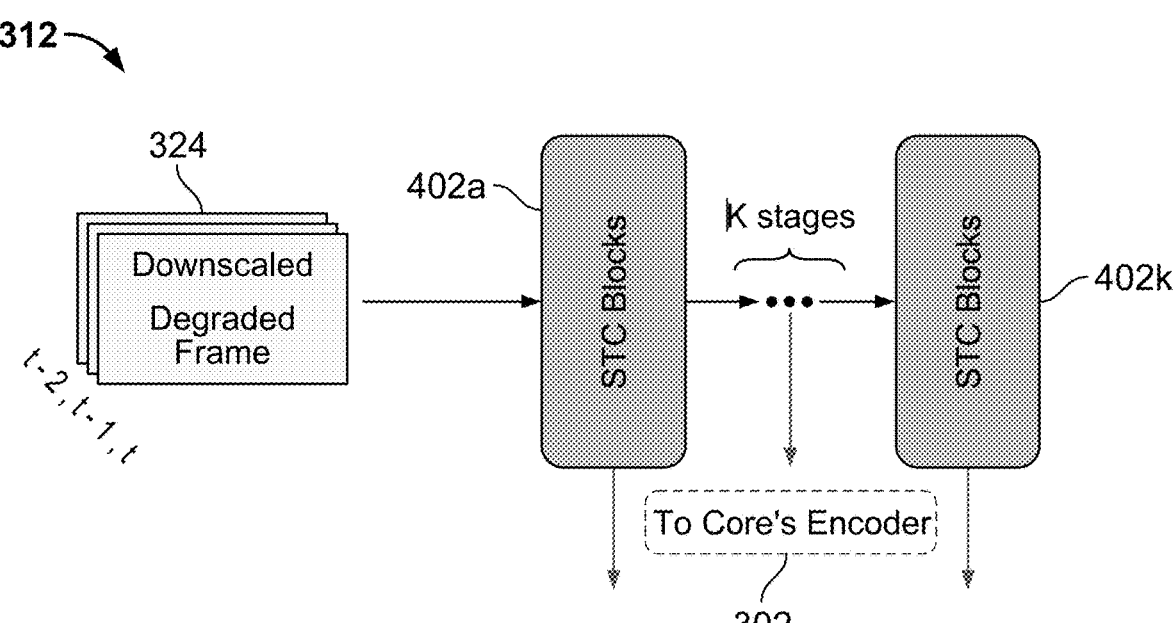
FIG. 4A is a diagram illustrating a look around model in accordance with some embodiments.

As seen in FIG. 4A, Look Around model 312 is comprised of K blocks of Separable Temporal Convolution (STC) layers 402a . . . 402k, which extract spatial and temporal features across frames from the downsampled input 324. The spatial features describe how objects and textures are arranged in each frame, while the temporal features capture how those objects move or change over time across frames. These features are used to guide the transformer diffusion model 300. Specifically, the output of each STC block is added to the corresponding stage of Encoder 302, providing global low-resolution context to supplement the local crop. This helps the encoder better interpret edges, motion, or objects that extend beyond the input window, ultimately improving restoration quality by enabling more informed global decisions.

Intermediate Stage 304

When utilizing Denoising Diffusion for restoration tasks, a key challenge lies in effectively incorporating both degraded data and additional conditional data such as Diffusion time steps into the transformer diffusion model 300. An improved conditional framework can significantly enhance the generative potential of Denoising Diffusions, guiding them towards producing realistic output that accurately matches the original sources. To fully leverage the capabilities of the Diffusion model, an alternative approach is employed.

After passing through K encoder stages, the feature maps enter the intermediate stage of transformer diffusion model 300, which is comprised of a stack of transformer blocks 304.

In this stage, the only additional input is the LOST embedding, which encodes conditional information like the Diffusion step and spatial location of the input crop.

Figure 6:
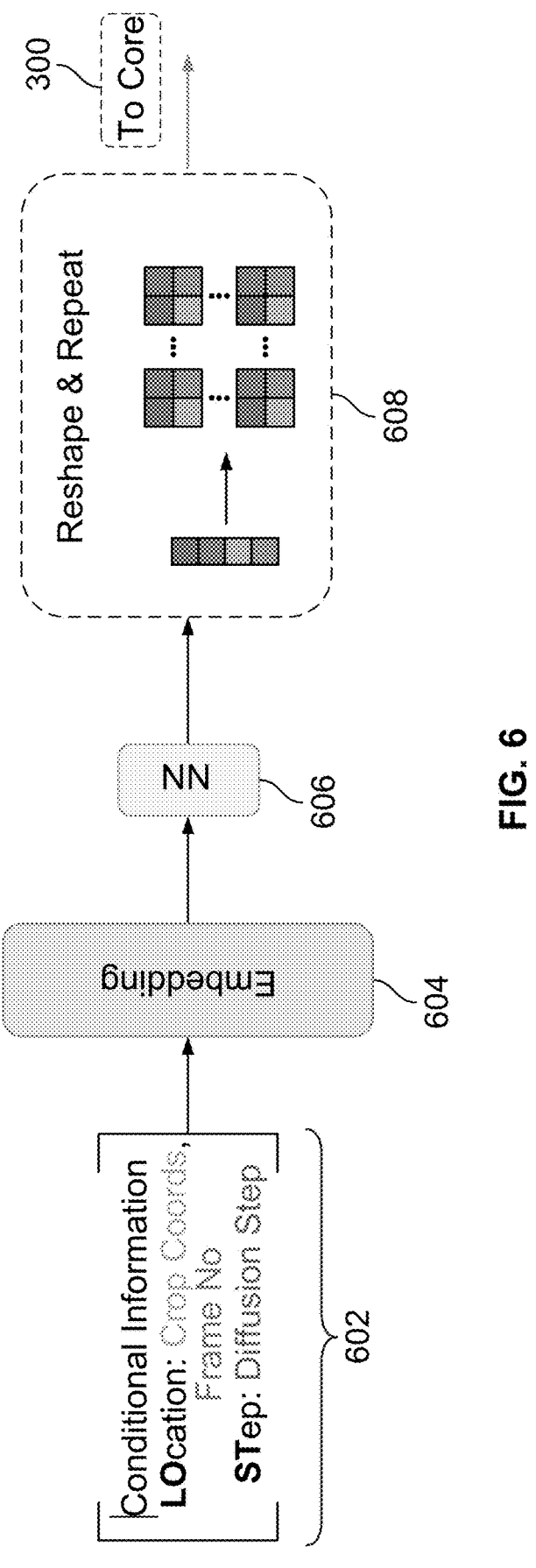
FIG. 6 is a diagram illustrating a LOST embedding in accordance with some embodiments.

As seen in FIG. 6, two types of conditional data 602 are introduced: 1) LOcation and 2) Diffusion STep, collectively referred to as LOST. The location data includes the index of the intermediate frame within the video clip, as well as the height and width of the input window in both original and down scaled resolutions (as used in Look Ahead and Look Around). For instance, the scaled crop points can be calculated as:

$$Scale_d = \frac{WindowSize_d}{OriginalSize_d}$$

$$CropPoint_{Downscaled,d} = \lfloor CropPoint_{Original,d} \times Scale_d \rfloor, \, d \in \{Width, Height\}$$

The step embedding corresponds to the QP used for video encoding. A dedicated embedding is independently trained for each of the six QP values. Once these embeddings 604 are obtained and concatenated into a larger vector, the vector is passed through a neural network (NN) 606 with SiLU activation to produce a more informative and compact embedding. This resulting embedding is then concatenated with the output of each transformer block to provide guidance and conditioning for subsequent blocks, thereby enhancing model performance. Since the NN output is a vector, it is reshaped 608 into a matrix with dimensions matching the core's kernel dimensions and replicated horizontally and vertically to align with the corresponding block sizes.

The input to the Lost embedding 314 is conditional information (step, frame number, window starting point scaled and original) and size of the final output. The output of the LOST embedding is process and encoded location and step information. The LOST embedding is obtained by applying an embedding function to all of the conditional information, concatenating all embedded tensors on the last dimension, applying the NN on the embedded tensors, reshaping the output from shape (1, L) to (1, l, l) where l= $\sqrt{Size}$, repeat the reshaped tensor along new dimensions, create a new dimension with size k=Size/l by replicating each element in the first reshaped dimension and the second reshaped dimension l times, and the resulting tensor will have the shape of (1, k×l, k×l).

Decoder 306

The input to decoder 306 is an output tensor from the transformer blocks associated with intermediate stage 304. This tensor is initially concatenated with LOST embedding 314 and an output of Look Ahead model 316. Subsequently, the concatenated tensor goes through an upsampling layer and a set of transformer blocks. The process repeats until the output goes through K stages of decoder 306.

Transformer diffusion model 300 employs a sliding window-based method, which presents challenges when scaling to longer sequences. Additionally, the difficulty of accurately estimating optical flow in highly compressed videos can degrade performance and increase computational overhead. To address these limitations, an auxiliary model called Look Ahead 316 is utilized to enhance transformer diffusion model 300's ability to anticipate future events and changes in the video. Look Ahead model 316 improves decoder 306's ability to restore video frames by incorporating information from future frames not present in the current input window.

Figure 4B:
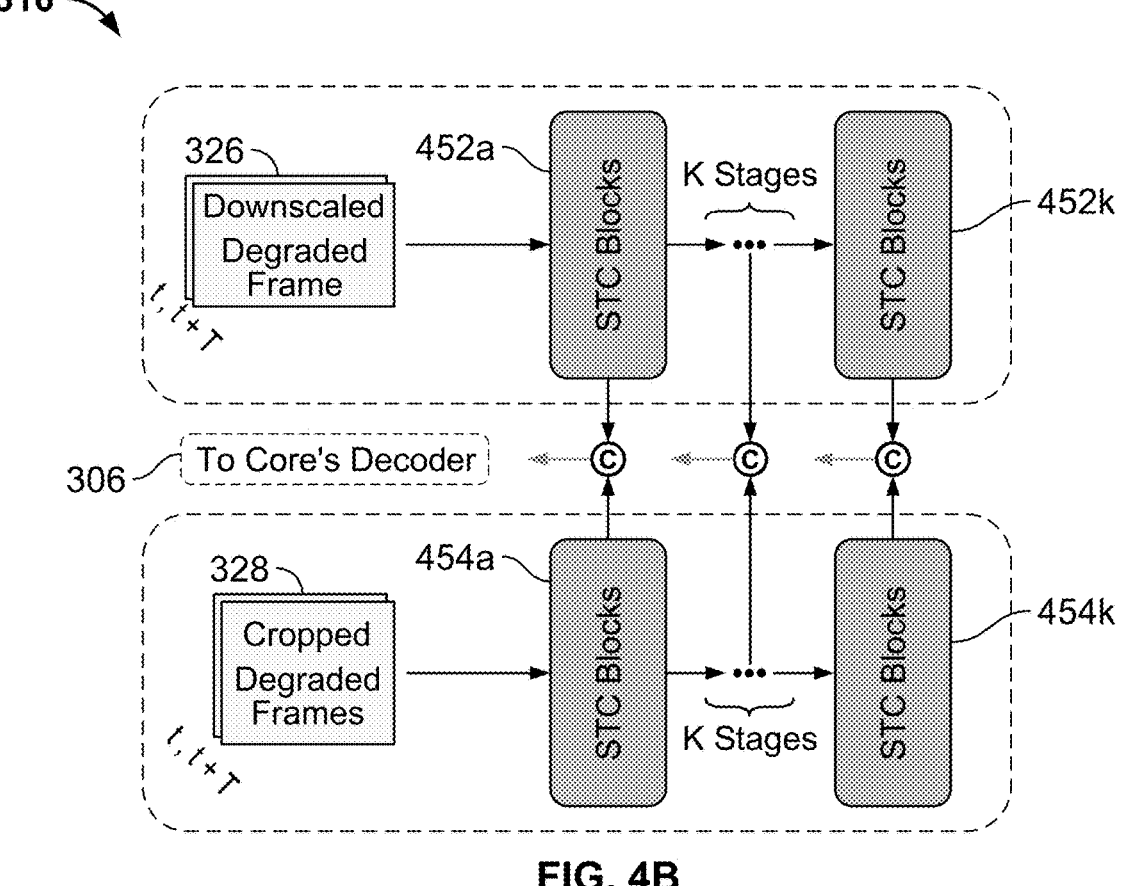
FIG. 4B is a diagram illustrating a look ahead model in accordance with some embodiments.

As seen in FIG. 4B, Look Ahead model 316 takes the down-sampled of next T frame 326 from the last frame in the input sequence and extracts informative features for the transformer diffusion model 300 using STC layers 452a . . . 452k. In addition to that frame, the Look Ahead model 316 is also fed the same window coordination of input 328 from the future frame. Spatial and temporal features extracted using K blocks of STC layers 454a . . . 454k from input 328. These two groups of data are processed separately and then concatenated ($\oplus$). Unlike the Look Around model 312, these extracted features are added to the corresponding levels of the transformer diffusion model's decoder 306. This addition enhances the decoder's restoration abilities.

Furthermore, a weight decay factor (WDF) is incorporated to control the influence of the Look Ahead model 316. This decay factor proves particularly beneficial when processing the last T frames of the clip, as the last frame is used as input for these frames.

The entire process can be formulated as follows: Let's denote the input frame set as $\{F_{qp1}, F_{qp2}, \ldots, F_{qpn}\}$ where $F_{qpn}$ represents the last frame in the input set. The frame of interest is then $F_{qp(n+T)}$.

$$WDF = \frac{Total \ Frame \ Numbrers - Middle \ Frame \ Position}{Total \ Frame \ Numbers}$$

$$LookAhead \left( \underbrace{DS\left(F_{qpn}^{7680 \times 4320}\right) \oplus DS\left(F_{qp(n+T)}^{7680 \times 4320}\right)}_{Group \ 1}, \underbrace{(F_{iqpn} \oplus F_{qp(n+t)} \circ M)}_{Group \ 2} \right) \times$$

$$WDF = L_{ah}$$

The optimal temporal window size (T) for the Look Ahead model 316 is identified by analyzing how the input changes with varying window sizes. Specifically, a frame referred to as N is randomly selected and subtracted from each subsequent frame, from N+1 to frame 300. For each subtraction result, the minimum, maximum, total number of non-zero pixels, and the average are calculated. This process may be repeated for various window sizes to evaluate the differences and identify the optimal temporal resolution.

Figure 5A:
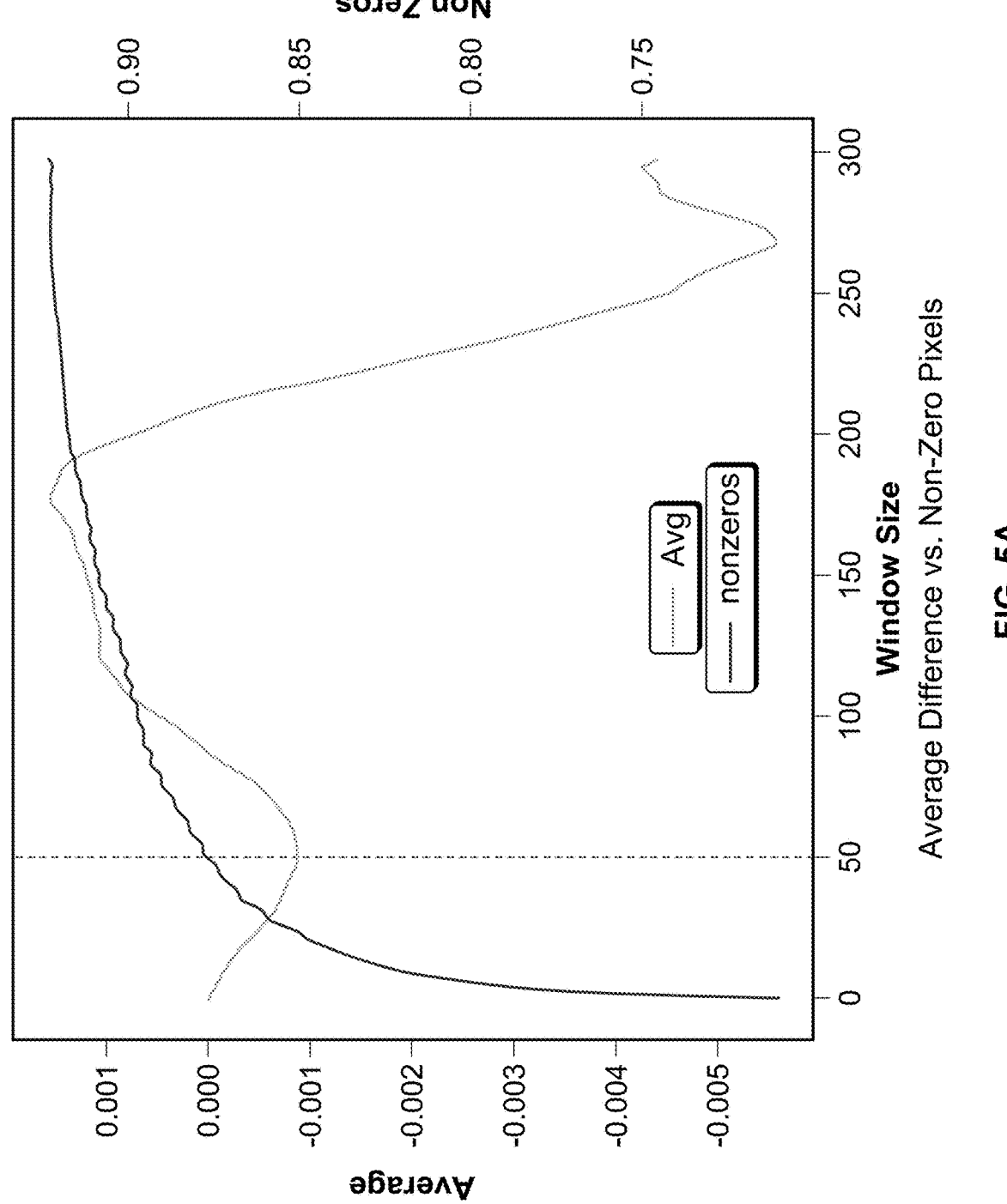
FIGS. 5A-5C illustrate a frame difference analysis in accordance with some embodiments.
Figure 5B:
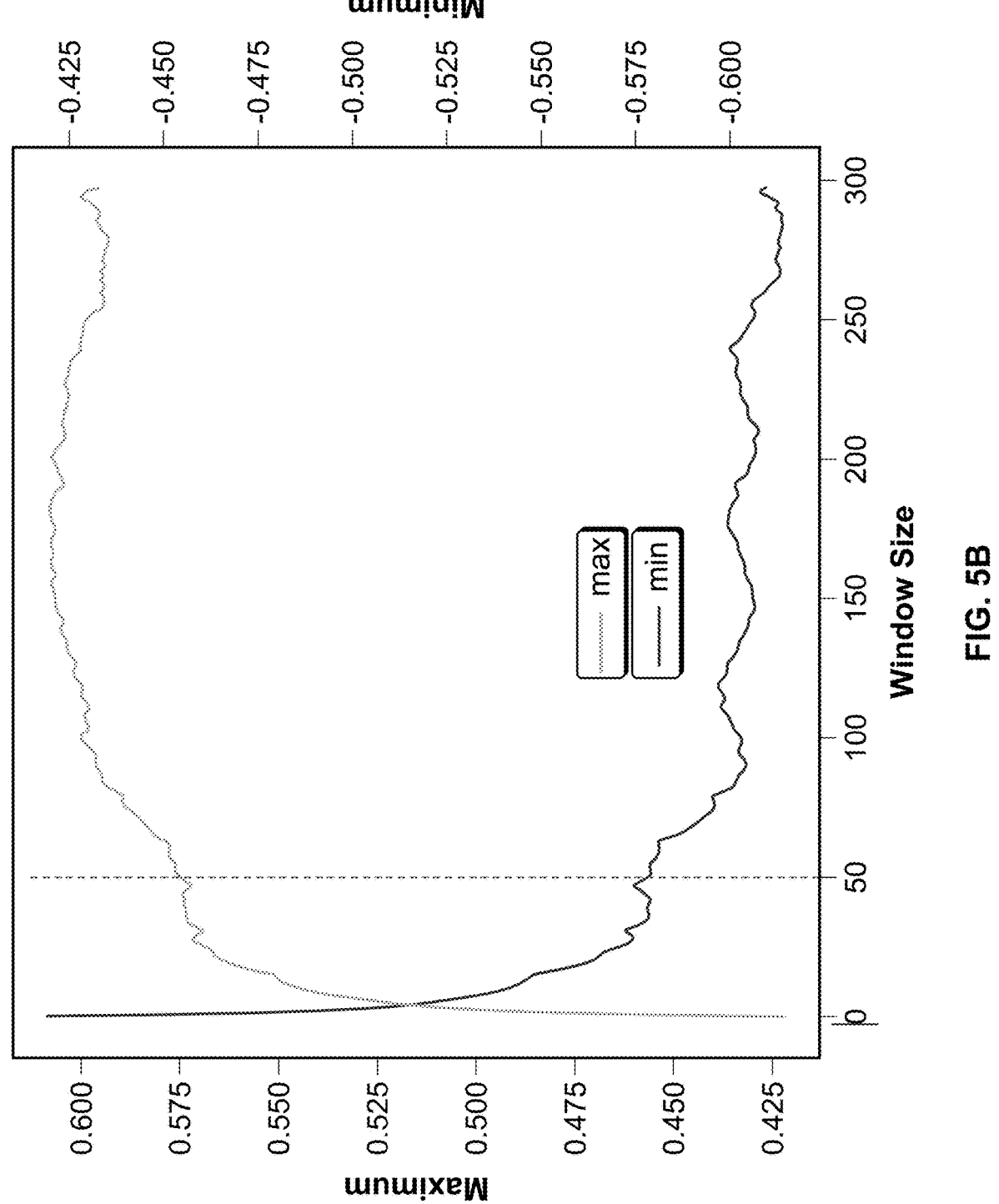
Figure 5C:
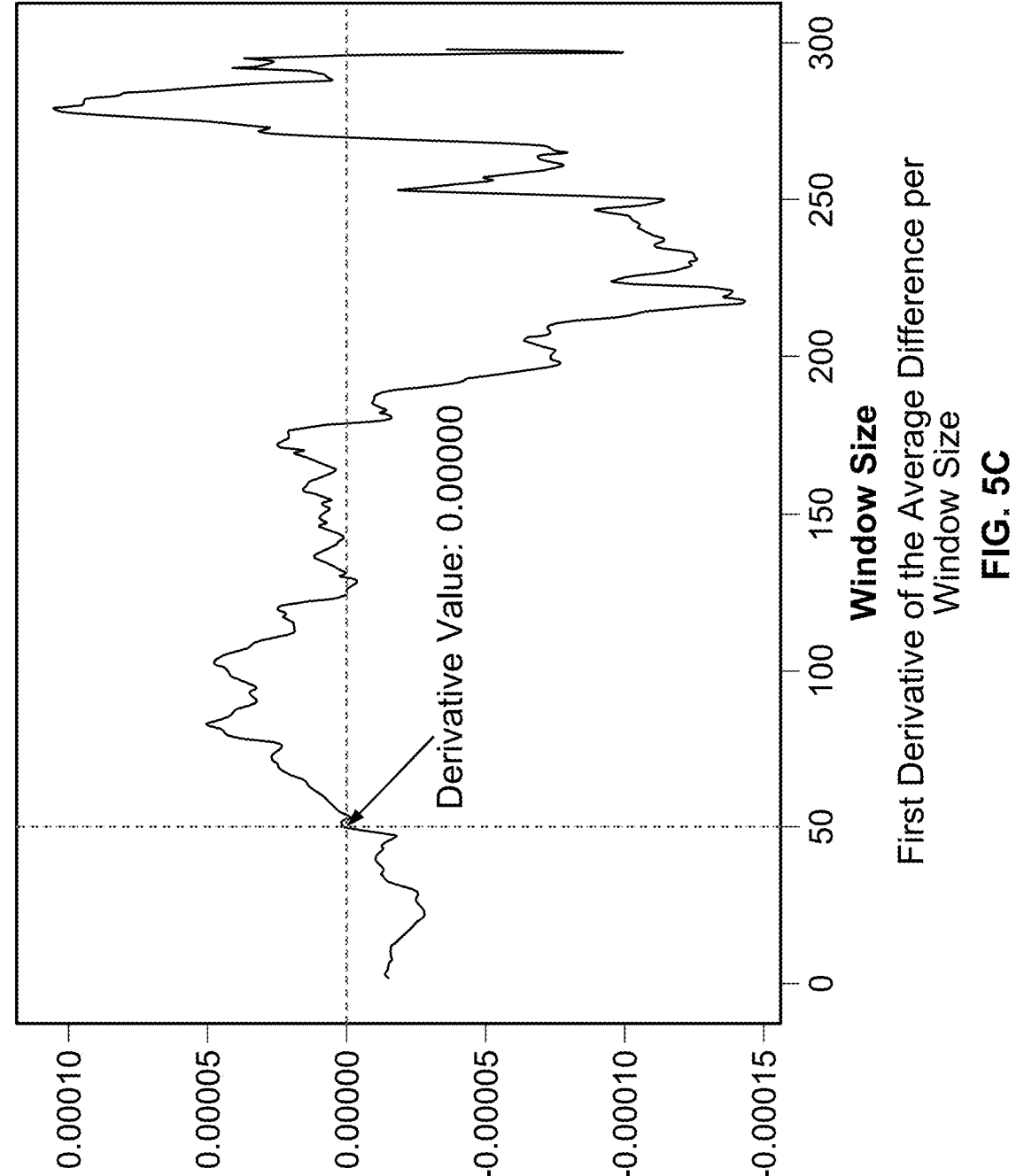

FIGS. 5A-5C illustrates a frame difference analysis, which reveals the most significant changes at a temporal window size (T) of 50, indicating it as the optimal size for the Look Ahead model. FIG. 5A indicates that the most significant changes occur at a window size of 50. As seen in FIG. 5B, the magnitude of change between window sizes 1 to 50 is considerably greater than that of between 50 to 299. Furthermore, the first derivative of the mean change, also depicted in FIG. 5C, approaches zero around window size 50.

Transformer Diffusion Model 300

Transformer diffusion model 300 is a U-shaped hierarchical network with skip connections between the encoder and the decoder. To be specific, given a triplet of degraded frames $F_{iqp} \in R^{3 \times H \times W \times C}$, the Transformer diffusion model 300 first applies a 3D convolutional layer with LeakyReLU and a kernel size of 3 to extract low-level features. Next, following the design of the U-shaped structures, the feature maps are passed through an encoder 302 having K encoder stages. Each stage contains a stack of the Transformer blocks and one down-sampling layer. The output of each stage is then concatenated with the output of K-th layer of Look Around and LOST before going through down sampling.

In the down-sampling layer, the flattened features are first reshaped into 3D spatial-temporal feature maps, which are then down-sampled. Then, an intermediate stage 304 with a stack of Transformer blocks is added at the end of the encoder. In this stage, only LOST is concatenated with the output of each block. For feature reconstruction, the decoder 306 also contains K stages. Each consists of an up-sampling layer and a stack of Transformer blocks similar to the encoder. After that, the features input to the Transformer blocks are the concatenation of the up-sampled features and the corresponding features from the encoder 302 through skip-connection and the output of K-th layer of the Look Ahead model 312 and LOST 314. Next, the Transformer blocks are utilized to learn to restore the frames. After the K decoder stages, the flattened features are reshaped to 3D feature maps, followed by the application of a 3D convolution layer with kernel size of 3 to extract artifacts and distortions targeted for removal from the frames. Due to the high computational cost of the standard Transformer architecture and its limitations in capturing local dependencies, a spatio-temporal compatible Transformer block is created based on the Locally enhanced Window (LeWin) Transformer introduced by Wang et al. in "Uformer: A general u-shaped transformer for image restoration." This block benefits from two key designs: Window-based Multiheaded Self-Attention, which performs self-attention within non-overlapping local windows significantly reducing computational cost, and an enhanced Feed-Forward Network that leverages local context.

Experimental Data

Datasets: A SEPE8K dataset is used for training. This dataset comprises 40 different 8K (8192×4320) video sequences, each captured at a framerate of 29.97 frames per second (FPS) with a duration of 10 seconds. The dataset is randomly split into 30, 5, and 5 sequences for training, testing, and validation, respectively. Using ffmpeg with the help of NVIDIA A6000 Ada GPU, frames are created from encoded videos using two codecs, HEVC/H.265 and AV1, with varying QPs. For HEVC, QPs ranging from 3 to 51 (maximum) with a step size of 3 are used, resulting in 17 quality levels. For AV1, QPs from 3 to 255 (maximum) with the same step size are used, yielding 85 quality levels. The total data occupied approximately 40 TB of storage. For training, each video is divided into 100 non-overlapping segments, each containing three frames. After loading the frames, 512*512 non-tile-wise window crops are randomly selected to prevent probable boundary artifacts. To broaden the evaluation of the model and ensure a fair comparison, it is also tested on a UVG 4K dataset, specifically selecting videos with a duration of 12 seconds, given the very limited availability of 8K datasets.

Implementation Details: Due to the performance gap between HEVC and AV1 in the high-resolution domain, the same model is trained on each codec separately. Training was conducted on a server with 8 NVIDIA A100 GPUs, taking 40 epochs for AV1 and 200 epochs for HEVC. The total training time, including experiments for the ablation study, was 40 days. Following the common training strategy for Transformers, the AdamW optimizer is employed with momentum terms of (0.9, 0.999) and a weight decay of 0.02. A learning rate warmup was also applied for approximately 3% of the initial epochs.

Evaluation Metrics: Commonly-used PSNR and SSIM metrics used adopted to evaluate the restoration performance. These metrics are calculated in the RGB.

Comparison

Figure 8A:
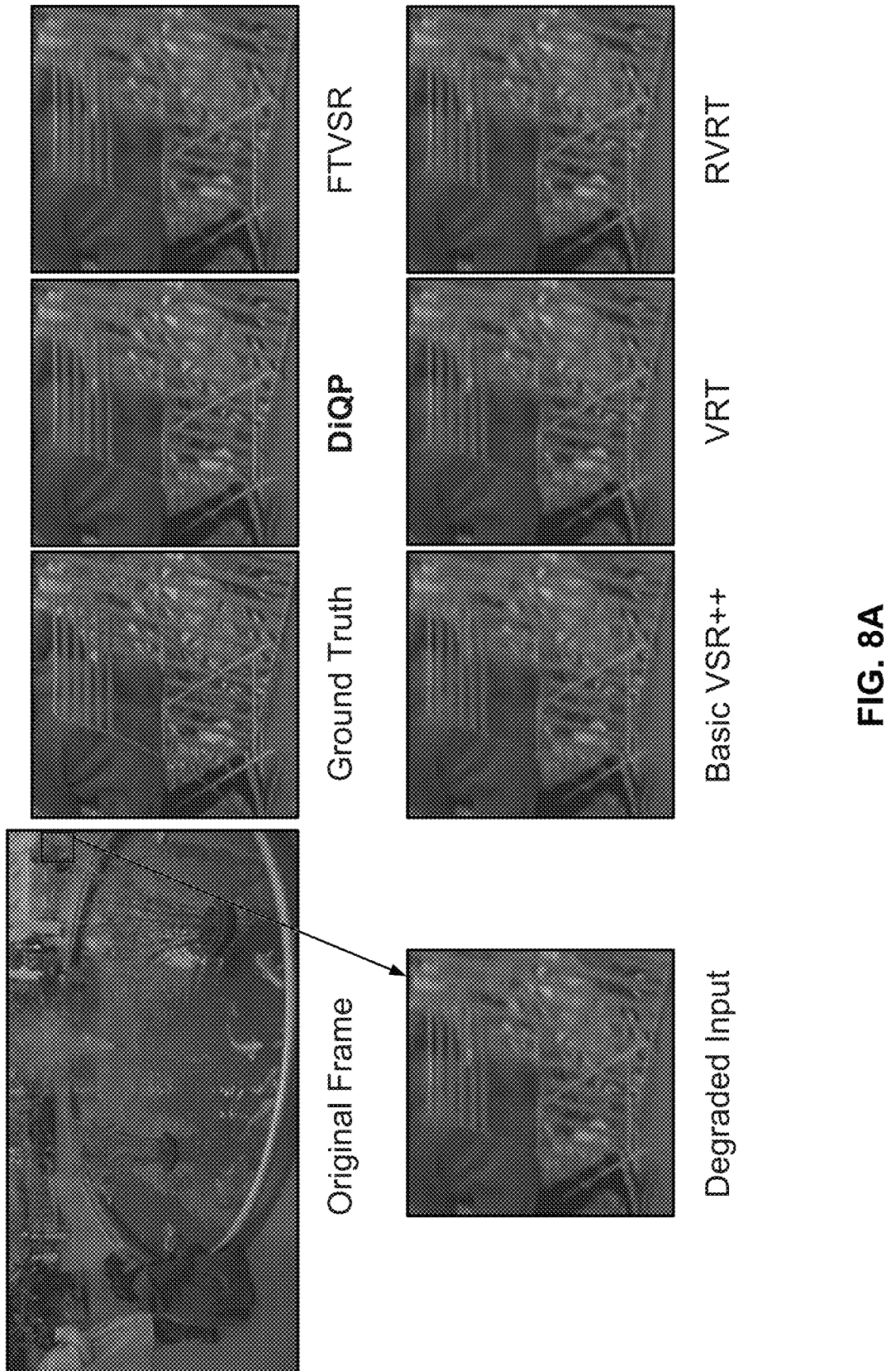
FIG. 8A illustrates a comparison of visual quality produced by different methods.
Figure 8B:
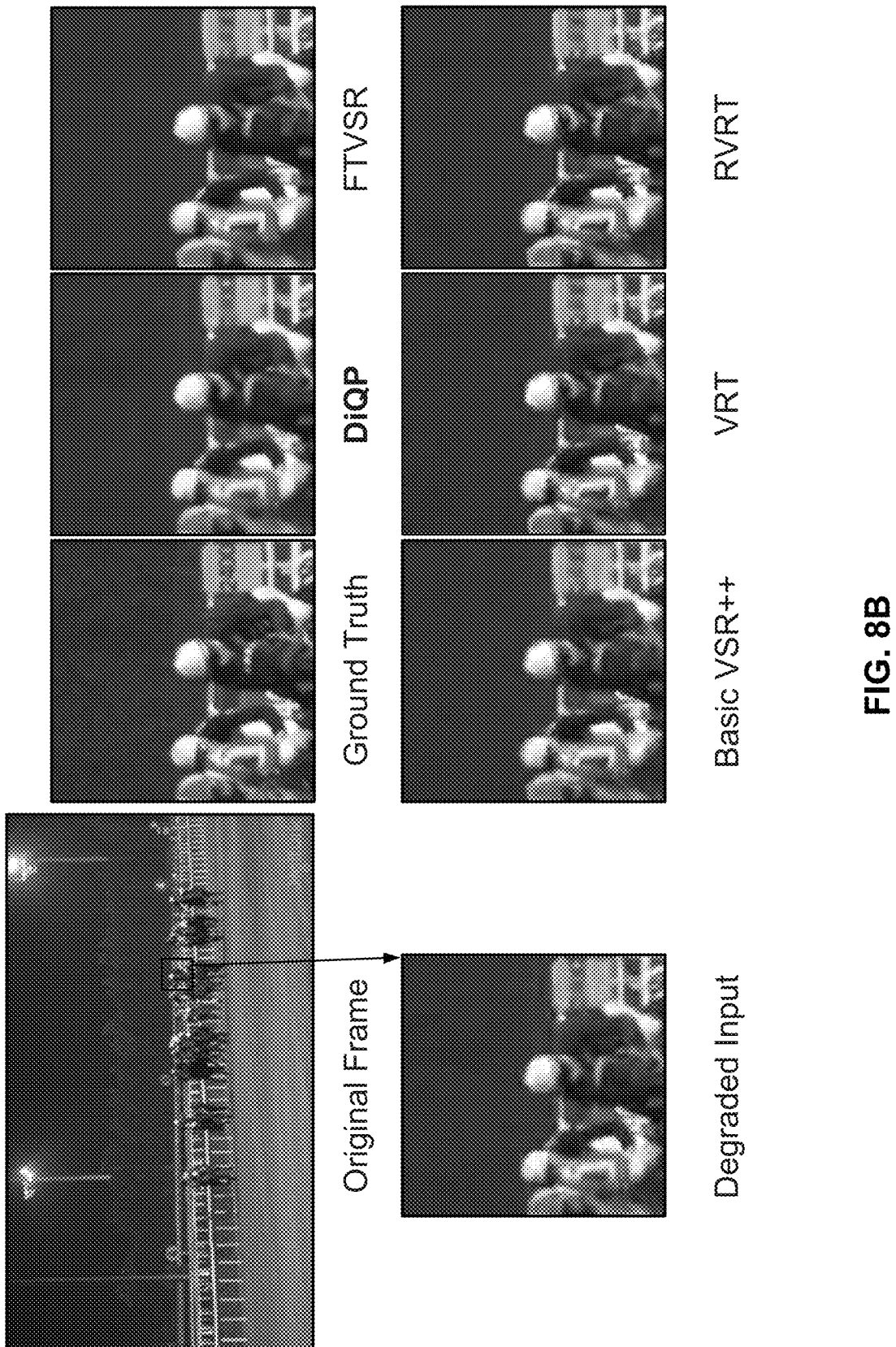
FIG. 8B illustrates a comparison of visual quality produced by different methods.

Four representative methods are selected in video restoration (VRT, RVRT, BasicVSR++, and FTVSR) as baselines to compare the transformer diffusion model. A quantitative comparison results between DiQP and baselines is presented Table 1 of FIG. 9. The test was conducted with the maximum QP available for both codecs. To provide additional context, metrics for the degraded input are also included. DiQP demonstrates the best performance on SEPE8K and UVG across both codecs. Compared with the baseline models, it improves the Peak Signal-to-Noise Ratio (PSNR) by significant margins of 1.77 to 1.99 dB in SEPE8K and 0.84 to 0.69 dB in UVG. For comparison with UVG, due to the fixed dimensions of the LOST embedding (learned specifically for 8K domains), the UVG 4K frames had to be upsampled to 8K using bicubic interpolation before performing restoration. After restoration, the results are downscaled and compared them with the original raw frames. This process likely affected the overall results, as some fine details may have been lost during the upscaling and downscaling steps. In Table 2 of FIG. 10, a comparison of the model parameters and runtime across different methods is presented, highlighting that DiQP, despite having the highest number of parameters, achieves the fastest runtime. The visual comparisons of different methods shown in FIG. 8A and FIG. 8B indicate that DiQP generates smoother and more clear HQ frames with removed artifacts, while other methods fail to restore fine textures and details. The second best performing model here is FTVSR because it has a better understanding of compression side effects on video.

Ablation Study

Figure 7:
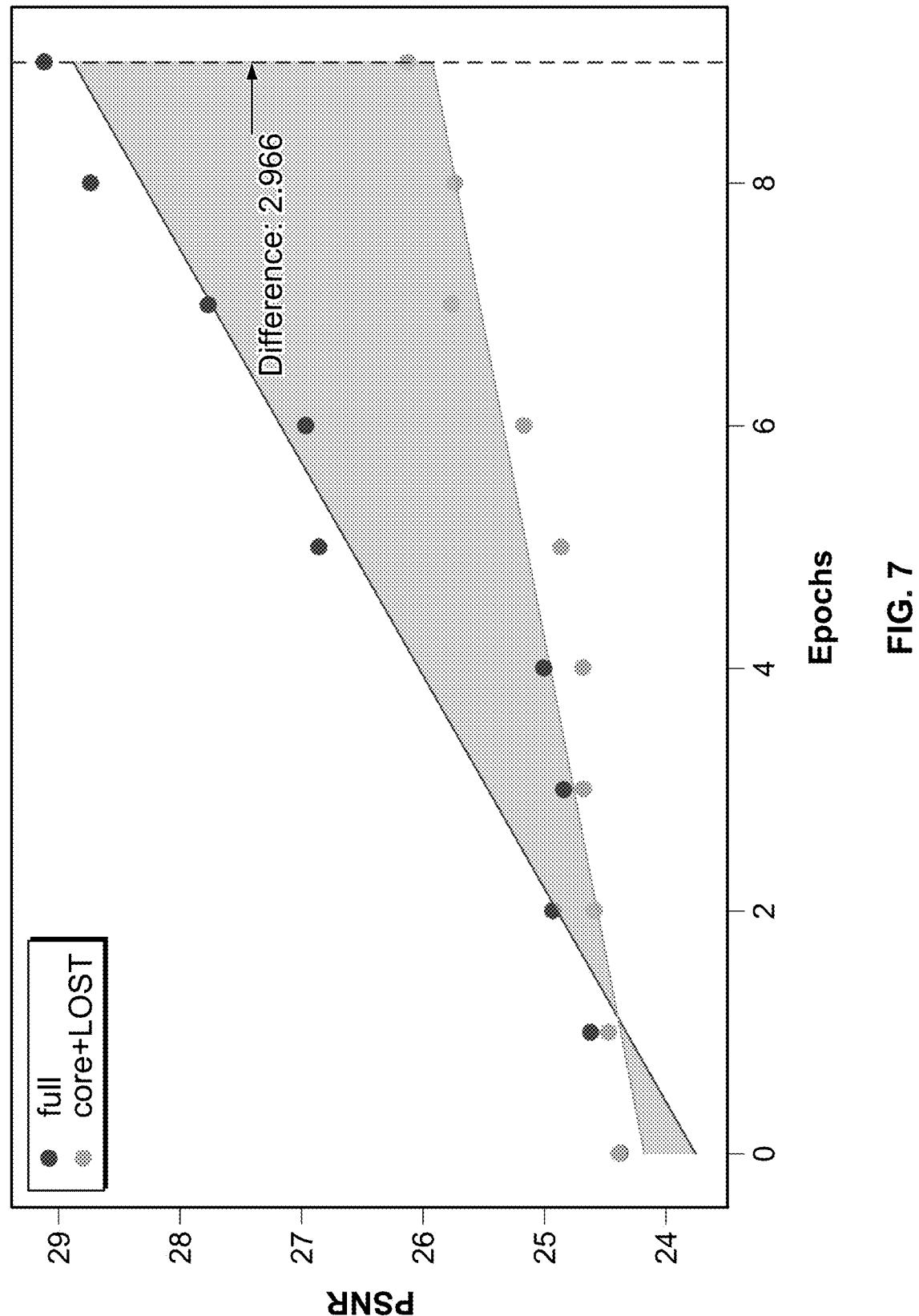
FIG. 7 is a diagram illustrating a result of an ablation study in accordance with some embodiments.

Understanding the Role of Auxiliary Models. An ablation study is conducted to evaluate the impact of Look Ahead and Look Around models on the overall performance. Due to computational constraints, the analysis is focused on comparing our complete, fully-featured DiQP model with a simplified version lacking the Look Ahead and Look Around modules. This targeted comparison allowed the contributions of these two models to be isolated and better understand their role in achieving the final performance of the complete model. In this experiment, both models were trained under identical conditions for 10 epochs. Their output quality was analyzed by calculating the PSNR between the generated results and the ground truth. Notably, after 10 epochs, a significant difference of approximately 3 dB in PSNR between the two models, as illustrated in FIG. 7, is observed.

CONCLUSION

DiQP is a novel Transformer-Diffusion model for 8K video restoration; specifically addressing the complex artifacts introduced by codec compression. By viewing the restoration process itself as a Deonising Diffusion model and leveraging the QP as the Diffusion step, this powerful framework is successfully applied to the challenging task of video restoration. The systems and methods disclosed herein demonstrate superior performance in restoring high-resolution videos from heavily compressed sources. The experimental results highlight the effectiveness of the core model in recovering fine details and improving overall visual quality compared to other existing models.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:
1. A method, comprising:
receiving a sequence of compressed video frames;
applying a transformer diffusion model to the sequence of compressed video frames, wherein applying the transformer diffusion model includes utilizing a look around model in an encoding portion of the transformer diffusion model and a look ahead model in a decoding portion of the transformer diffusion model; and
generating a restored video sequence based on an output of the transformer diffusion model.

2. The method of claim 1, wherein the sequence of compressed video frames has a video quality of 8K.

3. The method of claim 1, wherein the encoding portion of the transformer diffusion model is performed in a plurality of encoding stages.

4. The method of claim 3, wherein each stage of the plurality of encoding stages includes a corresponding plurality of transformer blocks and a corresponding down sampler.

5. The method of claim 4, wherein a corresponding output of each stage of the plurality of encoding stages is concatenated with an output of the look around model and a location and diffusion step (LOST) embedding.

6. The method of claim 5, wherein the look around model is comprised of a plurality of separable temporal convolution layers to extract spatial and temporal features across frames associated with the sequence of compressed video frames.

7. The method of claim 5, wherein the LOST embedding is based on conditional information that includes location information and a diffusion step.

8. The method of claim 7, wherein the location information encodes where a cropped window is within an overall portion of a video frame.

9. The method of claim 7, wherein the diffusion step encodes a quantization parameter used in video compression of the sequence of compressed video frames.

10. The method of claim 1, wherein the transformer diffusion model includes intermediate an intermediate stage that utilizes a stack of transformer blocks and concatenates features with a LOST embedding.

11. The method of claim 1, wherein the decoding portion of the transformer diffusion model is performed in a plurality of decoding stages.

12. The method of claim 11, wherein performing each stage of the plurality of decoding stages includes using a corresponding up sampler and a corresponding stack of transformer blocks.

13. The method of claim 12, wherein a corresponding output of each stage of the plurality of decoding stages is concatenated with an output of the look ahead model and a LOST embedding.

14. The method of claim 13, wherein the look ahead model utilizes a temporal window that includes a plurality of frames including a current frame and a plurality of subsequent frames.

15. A system, comprising:
a processor configured to:
   receive a sequence of compressed video frames;
   apply a transformer diffusion model to the sequence of compressed video frames, wherein being configured to apply the transformer diffusion model includes being configured to utilize a look around model in an encoding portion of the transformer diffusion model and a look ahead model in a decoding portion of the transformer diffusion model; and
   generate a restored video sequence based on an output of the transformer diffusion model; and
a memory coupled to the processor and configured to provide the processor with instructions.

16. The system of claim 15, wherein the encoding portion of the transformer diffusion model is performed in a plurality of encoding stages, wherein each stage of the plurality of encoding stages includes a corresponding plurality of transformer blocks and a corresponding down sampler.

17. The system of claim 16, wherein a corresponding output of each stage of the plurality of encoding stages is concatenated with an output of the look around model and a location and diffusion step (LOST) embedding.

18. The system of claim 15, wherein the decoding portion of the transformer diffusion model is performed in a plurality of decoding stages, wherein each stage of the plurality of decoding stages is comprised of a corresponding up sampler and a corresponding stack of transformer blocks.

19. The system of claim 18, wherein a corresponding output of each stage of the plurality of decoding stages is concatenated with an output of the look ahead model and a LOST embedding.

20. A computer program product embodied in a non-transitory computer readable medium and comprising computer instructions for:
   receiving a sequence of compressed video frames;
   applying a transformer diffusion model to the sequence of compressed video frames, wherein applying the transformer diffusion model includes utilizing a look around model in an encoding portion of the transformer diffusion model and a look ahead model in a decoding portion of the transformer diffusion model; and
   generating a restored video sequence based on an output of the transformer diffusion model.

* * * * *